US012671210B2

(12) United States Patent
Zhao et al.

(10) Patent No.: US 12,671,210 B2
(45) Date of Patent: Jun. 30, 2026

(54) BATTERY PACK CONNECTOR WATERPROOF STRUCTURE AND BATTERY PACK

(71) Applicant: Shanghai Baicheng Electric Equipment Manufacture Co., Ltd., Shanghai (CN)

(72) Inventors: Xianguo Zhao, Shanghai (CN); Liangliang Zhou, Shanghai (CN); Chao Xin, Shanghai (CN)

(73) Assignee: Shanghai Baicheng Electric Equipment Manufacture Co., Ltd., Shanghai (CN)

( * ) Notice: Subject to any disclaimer, the term of this patent is extended or adjusted under 35 U.S.C. 154(b) by 318 days.

(21) Appl. No.: 18/421,661

(22) Filed: Jan. 24, 2024

(65) Prior Publication Data

US 2025/0079755 A1      Mar. 6, 2025

(30) Foreign Application Priority Data

Aug. 30, 2023    (CN) ........................... 202311110602.8

(51) Int. Cl.
　　*H01R 13/52*　　　(2006.01)
　　*H01M 50/186*　　(2021.01)
　　*H01M 50/586*　　(2021.01)
(52) U.S. Cl.
　　CPC ...... H01R 13/5219 (2013.01); H01M 50/186 (2021.01); H01M 50/586 (2021.01)
(58) Field of Classification Search
　　CPC ............ H01R 13/5219; H01M 50/586; H01M 50/186

(Continued)

(56) References Cited

U.S. PATENT DOCUMENTS 5,277,610 A 　　 1/1994 　Krehbiel et al.
9,172,115 B2 * 10/2015 　Kolden ............... H01M 10/425
　　　　　　　　　(Continued)

FOREIGN PATENT DOCUMENTS

CN 　　115133211 A 　　 9/2022
CN 　　115602980 A 　　 1/2023
　　　　　　　(Continued)

OTHER PUBLICATIONS

Extended European Search Report for European Application No. 23215497.1, dated Jun. 11, 2024 (Jun. 11, 2024)—12 pages.

*Primary Examiner* — Harshad C Patel
(74) *Attorney, Agent, or Firm* — CM Law PLLC; Stephen J. Weed

(57) ABSTRACT

A battery pack connector waterproof structure includes a housing, a support plate and a connector assembly. The housing is internally provided with an accommodation space. An upper housing is provided with connector insertion holes. The upper housing is provided with an annular protrusion protruding toward a lower housing. A support plate is secured to the lower housing in the accommodation space. A connector assembly includes a connector seat and metal clips. The metal clips are inserted into the connector seat and correspond to the connector insertion holes in a one-to-one manner. An upper end face of the connector seat and a lower end face of the connector seat are each provided with a sealing recess in which a sealing member is disposed. The annular protrusion of the upper housing is inserted into a first sealing recess. The sealing member in a second sealing recess abuts against the support plate.

18 Claims, 5 Drawing Sheets

(58) Field of Classification Search
USPC ........................................................ 439/587
See application file for complete search history.

(56)                          References Cited

U.S. PATENT DOCUMENTS

| | | | | |
|---|---|---|---|---|
| 11,563,239 | B2 * | 1/2023 | Counts ................. | H05K 3/3447 |
| 11,611,124 | B2 * | 3/2023 | Stanton ............... | H01M 50/244 |
| 11,670,819 | B2 * | 6/2023 | Rowe ................ | H01M 10/0525 |
| | | | | 429/99 |
| 11,677,116 | B2 * | 6/2023 | Nagahama ........ | H01M 10/4257 |
| | | | | 429/7 |
| 2012/0045667 | A1 * | 2/2012 | Yoneda ............... | H01M 50/296 |
| | | | | 429/7 |
| 2014/0295257 | A1 * | 10/2014 | Harada .................... | B25F 5/02 |
| | | | | 429/179 |
| 2014/0302353 | A1 * | 10/2014 | Ogura ................. | H01M 50/572 |
| | | | | 429/7 |
| 2015/0214520 | A1 * | 7/2015 | Nishikawa .......... | H01M 50/247 |
| | | | | 429/100 |
| 2016/0241065 | A1 * | 8/2016 | Kondo ................ | H01M 50/213 |
| 2020/0251696 | A1 | 8/2020 | Qiao | |

FOREIGN PATENT DOCUMENTS

| | | | |
|---|---|---|---|
| CN | 218849936 | U | 4/2023 |
| CN | 219086298 | U | 5/2023 |
| EP | 3477782 | A1 | 5/2019 |
| WO | 2021082789 | A1 | 5/2021 |

* cited by examiner

BATTERY PACK CONNECTOR WATERPROOF STRUCTURE AND BATTERY PACK

CROSS-REFERENCE TO RELATED APPLICATIONS

This disclosure claims priority to Chinese Patent Application No. 202311110602.8 filed Aug. 30, 2023, the disclosure of which is incorporated herein by reference in its entirety.

TECHNICAL FIELD

The present invention relates to the field of battery pack technology and, in particular, to a battery pack connector waterproof structure and a battery pack.

BACKGROUND

As an external power supply of a power tool, a battery pack is internally provided with a battery assembly. If the battery pack is used in an environment with high air moisture, for example, if the battery pack is used near the sea or on a machine such as a pump or a cleaning machine, water vapor and water drops may enter the interior of the battery pack, thereby causing an internal electronic component or a battery cell to be short-circuited and fail.

An output connector is a window for the outputting of a battery-pack-type product. One end of the output connector is electrically connected to the battery pack, and the other end of the output connector is configured to be connected to a metal insertion piece of the power tool. Therefore, the sealing mode of the output connector is vital for the battery pack.

Therefore, a battery pack connector waterproof structure and a battery pack are urgently needed to solve the preceding technical problem.

SUMMARY

The present invention provides a battery pack connector waterproof structure and a battery pack so as to avoid a corrosion or short circuit caused by the contact with water vapor or liquid in the battery pack.

The present invention adopts the technical solutions below.

A battery pack connector waterproof structure is provided. The battery pack connector waterproof structure includes a housing, a support plate, and a connector assembly.

The housing is internally provided with an accommodation space. The housing includes an upper housing and a lower housing. The upper housing is provided with connector insertion holes. The upper housing is provided with an annular protrusion protruding toward the lower housing.

The support plate is secured to the lower housing in the accommodation space.

The connector assembly includes a connector seat and a plurality of metal clips. The plurality of metal clips are inserted into the connector seat and correspond to the connector insertion holes in a one-to-one manner. An upper end face of the connector seat is provided with a first sealing recess in a circumferential direction. A first sealing member is disposed in the first sealing recess. The annular protrusion is inserted into the first sealing recess. The connector seat and a portion of the upper housing form a subspace. The plurality of metal clips are located in the subspace. A lower end face of the connector seat is provided with a second sealing recess in the circumferential direction. A second sealing member is disposed in the second sealing recess. The second sealing member abuts against the support plate. The plurality of metal clips pass through the support plate.

In an embodiment, the lower end face of the connector seat is further provided with a third sealing recess. The plurality of metal clips pass through a bottom of the third sealing recess. A third sealing member is disposed in the third sealing recess. The third sealing member is configured to fill a gap between the plurality of metal clips and the third sealing recess.

In an embodiment, the third sealing recess communicates with the second sealing recess. The third sealing member and the second sealing member are formed integrally.

In an embodiment, the battery pack connector waterproof structure further includes a fourth sealing member configured to fill a circumferential gap between the plurality of metal clips and the support plate.

In an embodiment, the connector seat is provided with a plurality of connector insertion recesses corresponding to the connector insertion holes. A first partition is disposed between two adjacent ones of the plurality of connector insertion recesses. The first partition is secured to the connector seat.

In an embodiment, the first partition and the connector seat are formed integrally.

In an embodiment, two adjacent first partitions are connected through a second partition.

In an embodiment, the first partitions and the second partition are formed integrally.

In an embodiment, the connector seat, the first partitions, and the second partition are formed integrally.

A battery pack is further provided. The battery pack includes a battery and the preceding battery pack connector waterproof structure. The battery is secured to the lower housing. The support plate is laid between the battery and an upper housing. The metal clips are electrically connected to the battery.

BRIEF DESCRIPTION OF DRAWINGS

To illustrate the technical solutions in embodiments of the present invention more clearly, the drawings used in the description of the embodiments of the present invention are briefly described below. Apparently, the drawings described below illustrate only part of the embodiments of the present invention, and those of ordinary skill in the art may obtain other drawings based on the embodiments of the present invention and the drawings on the premise that no creative work is done.

REFERENCE LIST

Figure 1:
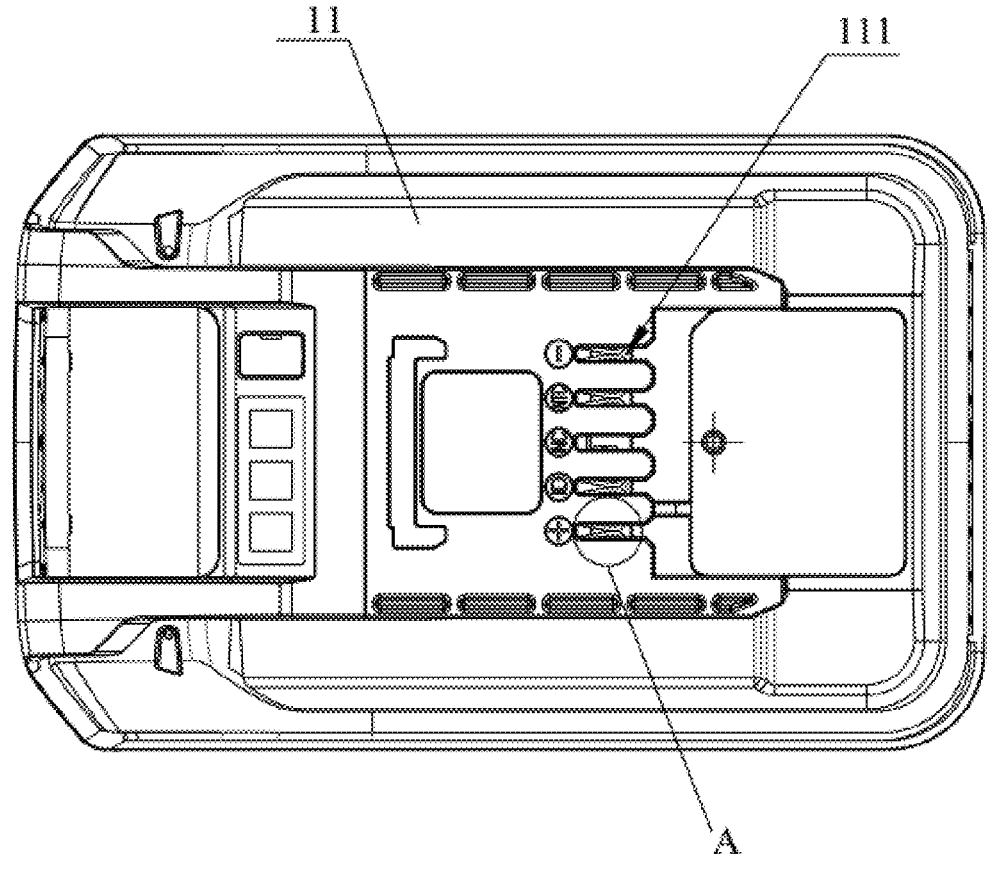
FIG. 1 is a structural view of an upper housing according to an embodiment of the present invention.

11 upper housing
111 connector insertion hole
112 annular protrusion
20 support plate
21 foolproof hole
30 connector assembly
31 connector seat
311 first sealing member
312 second sealing member
313 third sealing member
314 fourth sealing member
315 foolproof column
32 metal clip
321 first connection end
322 second connection end
33 first partition
34 second partition

DETAILED DESCRIPTION

The present invention is further described hereinafter in detail in conjunction with drawings and embodiments. It is to be understood that the specific embodiments set forth below are intended to illustrate and not to limit the present invention. In addition, it is to be noted that for ease of description, only part, not all, of the structures related to the present invention are illustrated in the drawings.

In the description of the present invention, unless otherwise expressly specified and limited, the term "connected to each other", "connected" or "secured" is to be construed in a broad sense, for example, as securely connected, detachably connected or integrated; mechanically connected or electrically connected; directly connected to each other or indirectly connected to each other via an intermediary; or internal connection between two components or interaction relations between two components. For those of ordinary skill in the art, specific meanings of the preceding terms in the present invention may be construed based on specific situations.

In the present invention, unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

In the description of this embodiment, the orientation or position relationships indicated by terms "above", "below", "right" and the like are based on the orientation or position relationships shown in the drawings. These orientations or position relationships are merely for ease of description and simplifying an operation and do not indicate or imply that the referred device or element has a specific orientation and is constructed and operated in a specific orientation. Thus, these orientations or position relationships are not to be construed as limiting the present invention. In addition, the terms "first" and "second" are used only for distinguishing between descriptions and have no special meaning.

Figure 2:
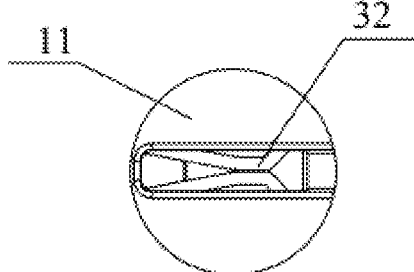
FIG. 2 is a partial enlarged view of a part A of FIG. 1.
Figure 3:
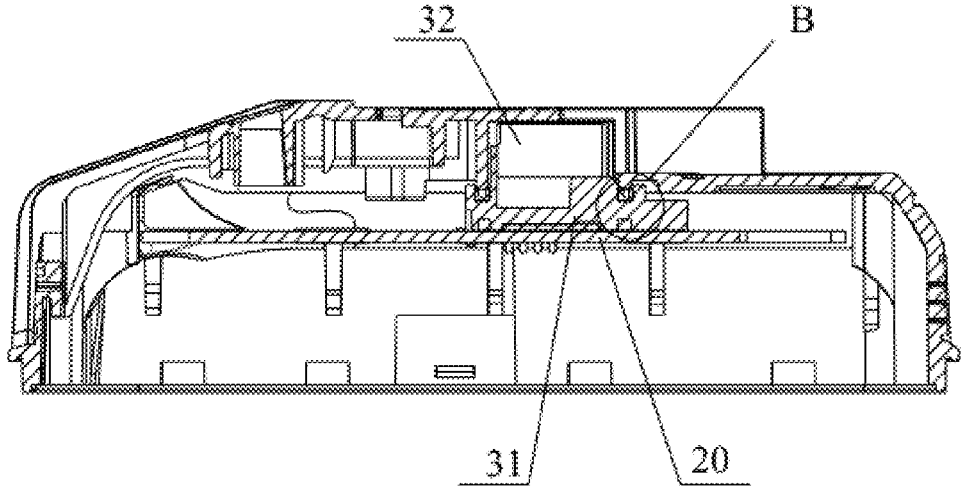
FIG. 3 is a sectional view of a battery pack connector waterproof structure according to an embodiment of the present invention.
Figure 4:
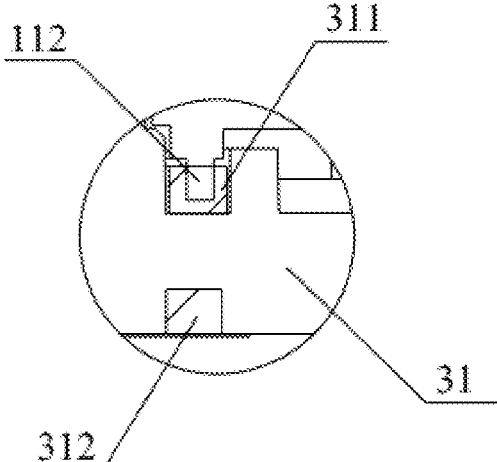
FIG. 4 is a partial enlarged view of a part B of FIG. 3.
Figure 5:
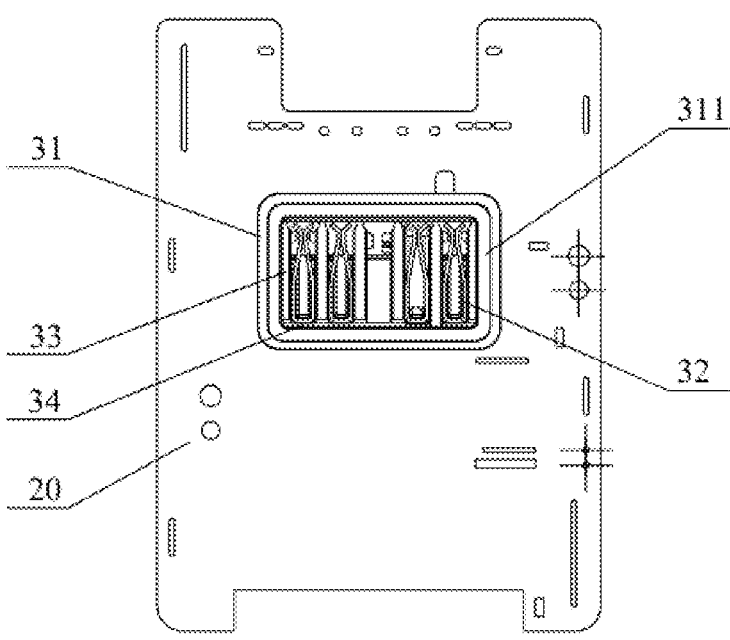
FIG. 5 is a front view of a connector assembly and a support plate according to an embodiment of the present invention.
Figure 6:
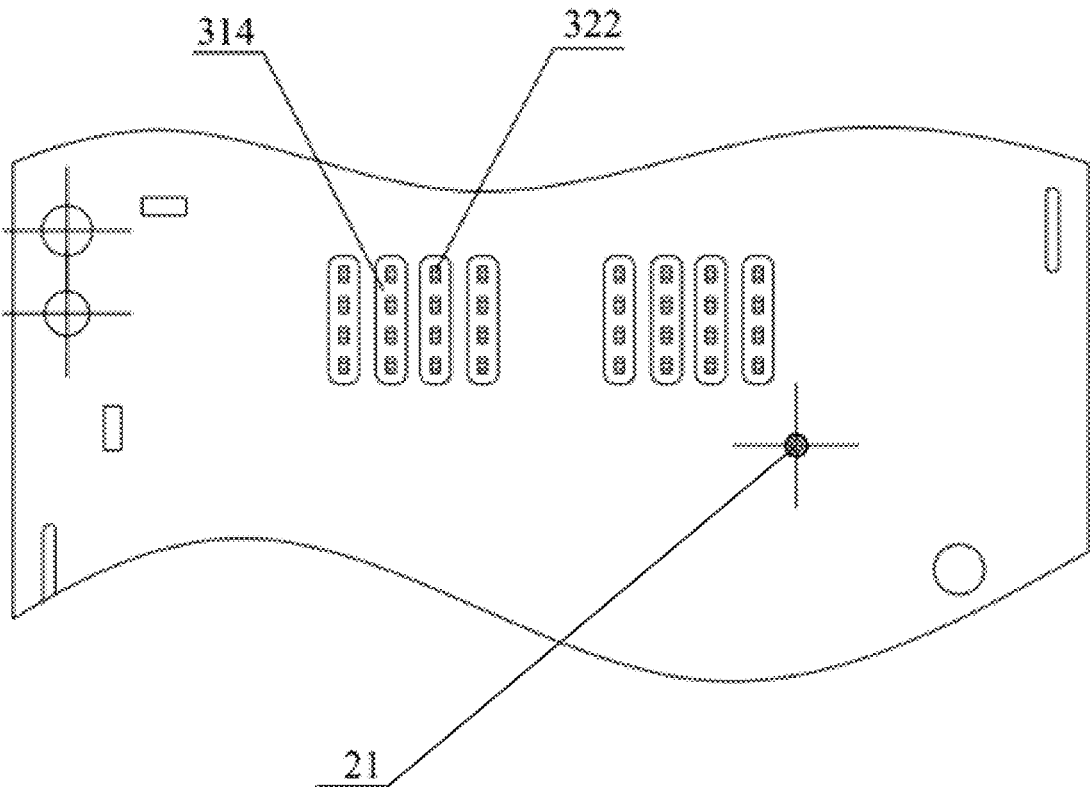
FIG. 6 is a rear view of the connector assembly and the support plate according to an embodiment of the present invention.
Figure 7:
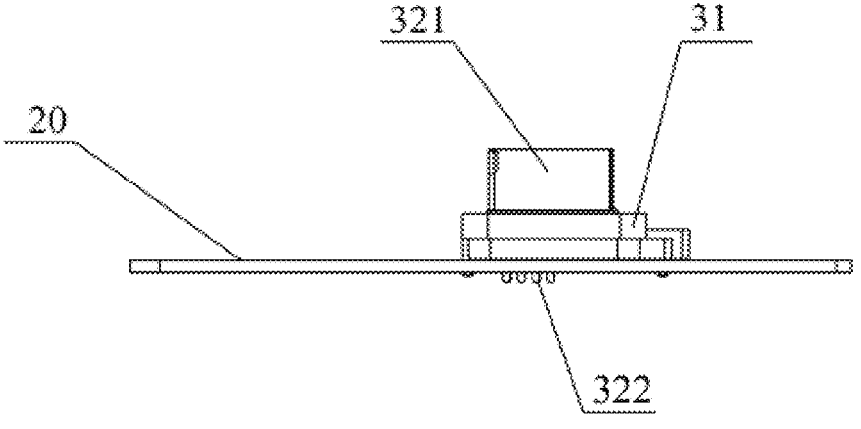
FIG. 7 is a side view of the connector assembly and the support plate according to an embodiment of the present invention.
Figure 8:
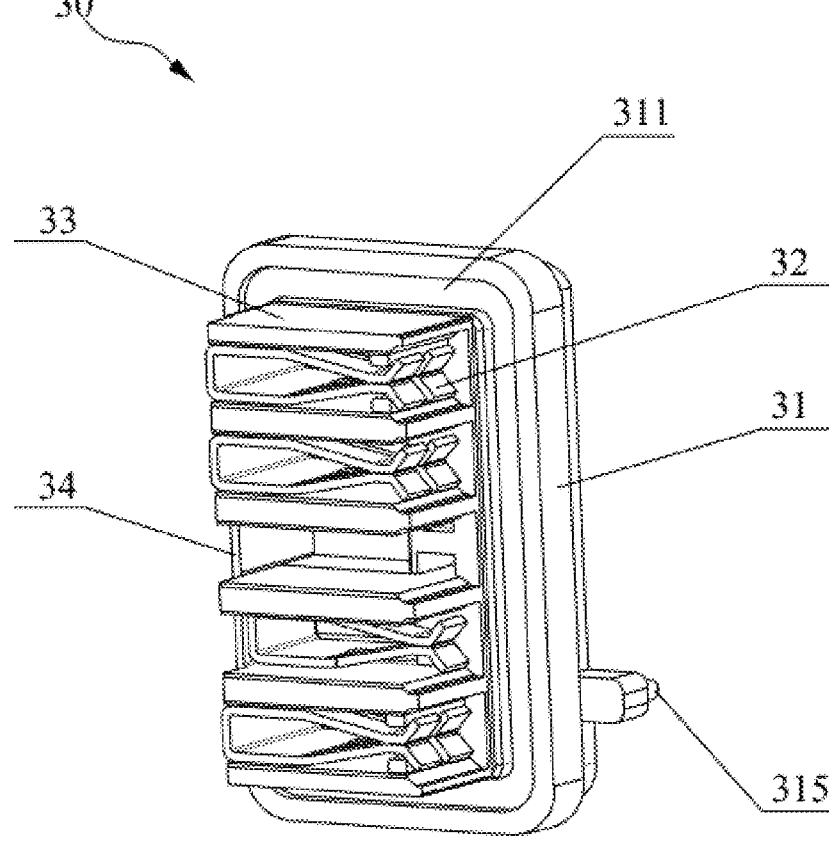
FIG. 8 is a structural view of the connector assembly according to an embodiment of the present invention.
Figure 9:
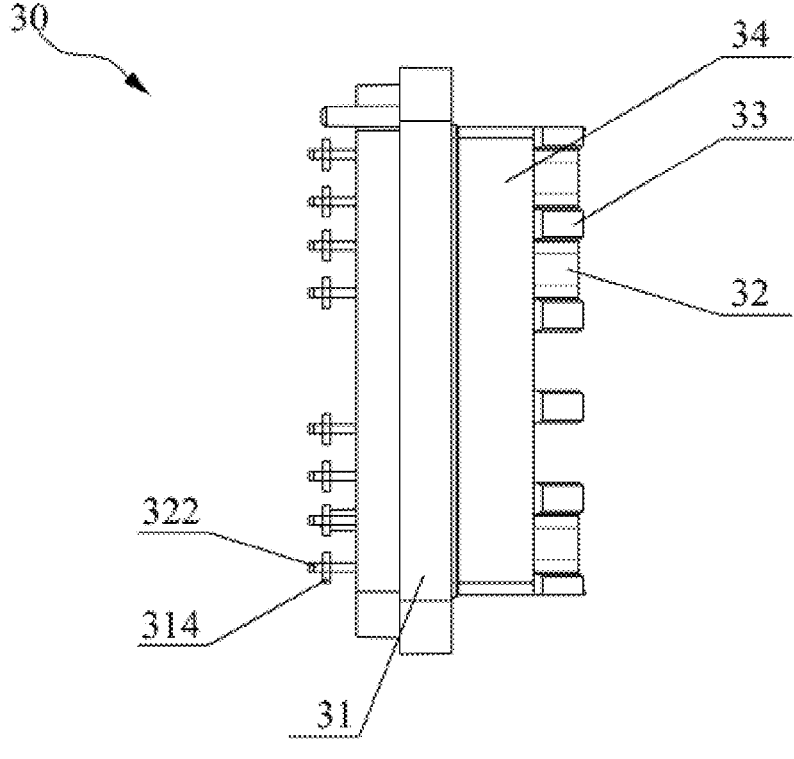
FIG. 9 is a side view of the connector assembly according to an embodiment of the present invention.
Figure 10:
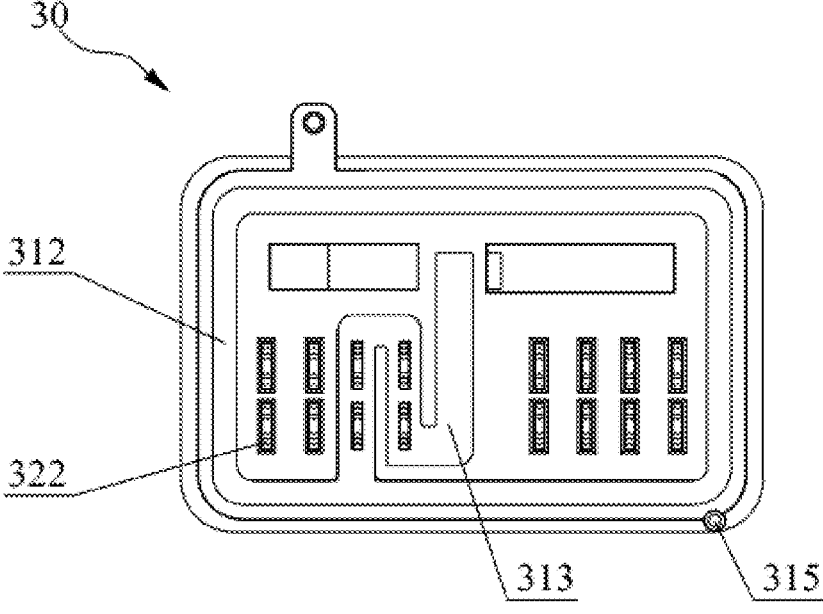
FIG. 10 is a rear view of the connector assembly according to an embodiment of the present invention.

As shown in FIGS. 1 to 10, the present invention provides a battery pack connector waterproof structure. The battery pack connector waterproof structure includes a housing, a support plate 20, and a connector assembly 30. The housing is internally provided with an accommodation space. The housing includes an upper housing 11 and a lower housing. The upper housing 11 is provided with connector insertion holes 111. The upper housing 11 is provided an annular protrusion 112 protruding toward the lower housing. The support plate 20 is secured to the lower housing in the accommodation space. The connector assembly 30 includes a connector seat 31 and a plurality of metal clips 32. The metal clips 32 are inserted into the connector seat 31 and correspond to the connector insertion holes 111 in a one-to-one manner. An upper end face of the connector seat 31 is provided with a first sealing recess in a circumferential direction. A first sealing member 311 is disposed in the first sealing recess. The annular protrusion 112 is configured to be inserted into the first sealing recess. A portion of the upper housing 11 and the connector seat 31 form a subspace. The metal clips 32 are located in the subspace. A lower end face of the connector seat 31 is provided with a second sealing recess in the circumferential direction. A second sealing member 312 is disposed in the second sealing recess. The second sealing member 312 abuts against the support plate 20. The metal clips 32 pass through the support plate 20.

Specifically, the connector assembly 30 is mounted on the support plate 20. The connector seat 31 is sandwiched between the upper housing 11 and the support plate 20. The connector seat 31 is provided with connector insertion recesses. The connector insertion recesses correspond to the connector insertion holes 111 disposed on the upper housing 11 in a one-to-one manner. One metal clip 32 is inserted in each connector insertion recess. Each metal clip 32 includes a first connection end 321 and a second connection end 322. The first connection end 321 is exposed outside the housing through a connector insertion hole 111 disposed on the upper housing 11. A power tool is connected to the first connection end 321 of the metal clip 32 through the connector insertion hole 111. The second connection end 322 is electrically connected to a battery in a battery pack.

Further, since the metal clip 32 is a main member of the battery pack conveying electrical energy to an object, the waterproof protection for the metal clip 32 is vital. In this embodiment, the upper end face of the connector seat 31 is provided with the first sealing recess, and the first sealing member 311 is disposed in the recess. When the upper housing 11 is assembled with the connector seat 31, the annular protrusion 112 of the upper housing 11 can be inserted into the first sealing recess and abuts against the first sealing member 311. The portion of the upper housing 11 and the upper end face of the connector seat 31 form the subspace. The first connection end 321 of the metal clip 32 is located in the subspace and communicates with the outside of the housing only through the connector insertion hole 111. When in use, a metal insertion piece of the power tool extends into the connector insertion hole 111 and is connected to the first connection end 321. With this arrangement, the power tool also blocks the connector insertion hole 111 so that the subspace forms a relatively closed space so as to prevent the rainwater or liquid in the environment outside the housing from splashing directly into the subspace and causing a corrosion or short circuit of the metal clips 32 after coming into contact with the metal clips 32.

In common, an output connector on the housing needs to be connected to another external movable insertion member. In this case, the water vapor or liquid in the environment outside the housing enters the subspace from a gap between the movable insertion member and the housing. The sealing member 311 provides a seal between the upper housing 11 and the connector seat 31 so that the accommodation space is relatively independent of and sealed apart from the subspace, preventing the water vapor or liquid, after entering the subspace from this channel, from entering the accommodation space.

Further, the second connection end 322 of the metal clip 32 passes through the support plate 20 and is connected to the battery disposed below the support plate 20. A battery in a common battery pack is not provided with a waterproof configuration. To prevent the water vapor or liquid from coming into contact with the battery along the second connection end 322, waterproof sealing needs to be performed for a portion of the second connection end 322 located between the connector seat 31 and the support plate 20, i.e., a portion exposed outside the subspace. Accordingly, in this embodiment, the second sealing recess is further disposed at the bottom of the connector seat 31. The second sealing member 312 is further disposed in the second sealing recess. The second sealing member 312 can abut against the support plate 20 to fill a gap between the connector seat 31 and the support plate 20 and prevent the water vapor or liquid from entering the accommodation space.

With this arrangement, the isolation subspace formed between the upper end face of the connector seat 31 and the upper housing 11 and the secondary sealing formed between the lower end face of the connector seat 31 and the support plate 20 provide a waterproof protection for each part in the accommodation space, avoiding the corrosion or short circuit caused by the contact between the part and the water vapor or liquid.

Generally, when the battery pack is not connected to the power tool, the connector insertion hole 111 of the battery pack is in an exposed state. If the battery pack is placed in a relatively wet environment, the water vapor or liquid may directly enter the subspace from the connector insertion hole 111 to come into contact with the first connection end 321 of the metal clip 32, then pass through the first connection end 321 and the second connection end 322 sequentially, and finally come into contact with the battery, thereby causing the corrosion or short circuit inside the battery pack. Accordingly, in this embodiment, the lower end face of the connector seat 31 is further provided with a third sealing recess. The metal clip 32 passes through the bottom of the third sealing recess. A third sealing member 313 is disposed in the third sealing recess. The third sealing member 313 is configured to fill a gap between the metal clip 32 and the third sealing recess. With this arrangement, the third sealing member 313 blocks the path in which the water vapor or liquid moves from the first connection end 321 to the second connection end 322. After the water vapor or liquid enters the subspace from the connector insertion hole 111, the third sealing member 313 and the second sealing member 312 confine the water vapor or liquid in the subspace, preventing the water vapor or liquid from entering other regions in the battery pack via the subspace. Moreover, the connector seat 31 is provided with the third sealing recess for placing the third sealing member 313, preventing the third sealing member 313 from protruding from the lower end face of the connector seat 31, thereby preventing the distance between the connector seat 31 and the support plate from being increased, and thus preventing the second sealing member 312 from getting increased accordingly.

Optionally, the third sealing recess communicates with the second sealing recess. The third sealing member 313 and the second sealing member 312 are formed integrally. The metal clip 32 and the connector seat 31 may be sealed by glue so that the third sealing recess communicates with the second sealing recess, and the glue, with fluidity, can fill the third sealing recess and the second sealing recess simultaneously. That is, the third sealing member 313 and the second sealing member 312 are formed integrally, preventing the water vapor or liquid from coming into contact with the metal clip 32 at a joint gap between the third sealing member 313 and the second sealing member 312.

When the power tool is connected to the battery pack, the first connection end 321 of the metal clip 32 clamps the corresponding metal insertion piece on the power tool. When the power tool is separated from the battery pack, the metal insertion piece is pulled out from the connector insertion hole 111, and the metal clip 32 is subjected to a pulling force toward the upper housing 11, so that the connector seat 31 tends to move toward the upper housing 11. With this arrangement, a gap easily occurs between the second sealing member 312 and the support plate 20, which causes the water vapor or liquid in the subspace to enter the accommodation space from the gap and damage an internal electronic component.

Accordingly, in this embodiment, the battery pack connector waterproof structure further includes a fourth sealing member 314 configured to fill a circumferential gap between the metal clip 32 and the support plate 20. With this arrangement, even if the water vapor or liquid is in contact with the metal clip 32, the water vapor or liquid cannot come into contact with the battery along the metal clip 32 through the support plate 20.

Optionally, the connector seat 31 is provided with a plurality of connector insertion recesses corresponding to the connector insertion holes 111. A first partition 33 is disposed between two adjacent connector insertion recesses. The first partition 33 is secured to the connector seat 31. With this arrangement, respective metal clips 32 are independent of each other.

Optionally, the first partition 33 and the connector seat 31 are formed integrally.

Optionally, two adjacent first partitions 33 are connected to each other through a second partition 34. With this arrangement, a plurality of first partitions 33 are connected to each other through the second partition 34, enhancing the reliability of the structure thereof.

Optionally, the first partition 33 and the second partition 34 are formed integrally.

Optionally, the connector seat 31, the first partition 33, and the second partition 34 are formed integrally.

Optionally, a foolproof column 315 protrudes from the connector seat 31. A foolproof hole 21 is disposed on the support plate 20. The foolproof column 315 is configured to be inserted into the foolproof hole 21 so as to facilitate the mounting between the connector seat 31 and the support plate 20.

A battery pack is further provided. The battery pack includes a battery and the preceding battery pack connector waterproof structure. The battery is secured to the lower housing. The support plate 20 is laid between the battery and the upper housing 11. The metal clip 32 is electrically connected to the battery.

The present invention provides a battery pack connector waterproof structure. The battery pack connector waterproof structure includes a housing, a support plate, and a connector assembly. The housing is internally provided with the accommodation space. The housing includes an upper housing and a lower housing. The upper housing is provided with connector insertion holes. The upper housing is provided with an annular protrusion protruding toward the lower housing. The support plate is secured to the lower housing in the accommodation space. The connector assembly includes a connector seat and a plurality of metal clips. The plurality of metal clips are inserted into the connector seat and correspond to the connector insertion holes in a one-to-one manner. An upper end face of the connector seat is provided with a first sealing recess in a circumferential direction. A first sealing member is disposed in the first sealing recess. The annular protrusion is inserted into the first sealing recess. The connector seat and a portion of the upper housing form a subspace. The plurality of metal clips are located in the subspace. A lower end face of the connector seat is provided with a second sealing recess in the circumferential direction. A second sealing member is disposed in the second sealing recess. The second sealing member abuts against the support plate. The plurality of metal clips pass through the support plate. With this arrangement, the isolation subspace formed between the upper end face of the connector seat and the upper housing and the secondary sealing formed between the lower end face of the connector seat and the support plate form a waterproof protection for each part in the accommodation space, avoiding a corrosion or short circuit caused by the contact between the part and the water vapor or liquid.

What is claimed is:

1. A battery pack connector waterproof structure, comprising:

a housing, which is internally provided with an accommodation space and comprises an upper housing and a lower housing, wherein the upper housing is provided with connector insertion holes, and the upper housing is provided with an annular protrusion protruding toward the lower housing;

a support plate, which is secured to the lower housing in the accommodation space; and a connector assembly comprising a connector seat and a plurality of metal clips, wherein the plurality of metal clips are inserted into the connector seat and correspond to the connector insertion holes in a one-to-one manner, an upper end face of the connector seat is provided with a first sealing recess in a surrounding direction, a first sealing member is disposed in the first sealing recess, the annular protrusion of the upper housing is inserted into the first sealing recess, the connector seat and a portion of the upper housing form a subspace, the plurality of metal clips are located in the subspace, a lower end face of the connector seat is provided with a second sealing recess in the surrounding direction, a second sealing member is disposed in the second sealing recess, the second sealing member abuts against the support plate, and the plurality of metal clips pass through the support plate.

2. The battery pack connector waterproof structure according to claim 1, wherein the lower end face of the connector seat is further provided with a third sealing recess, the plurality of metal clips pass through a bottom of the third sealing recess, a third sealing member is disposed in the third sealing recess, and the third sealing member is configured to fill a gap between the plurality of metal clips and the third sealing recess.

3. The battery pack connector waterproof structure according to claim 2, wherein the third sealing recess directly connects with the second sealing recess, and the third sealing member and the second sealing member are molded one time.

4. The battery pack connector waterproof structure according to claim 1, further comprising a fourth sealing member configured to fill a surrounding gap between the plurality of metal clips and the support plate.

5. The battery pack connector waterproof structure according to claim 1, wherein the connector seat is provided with a plurality of connector insertion recesses corresponding to the connector insertion holes, a first partition is disposed between two adjacent ones of the plurality of connector insertion recesses, and the first partition is secured to the connector seat.

6. The battery pack connector waterproof structure according to claim 5, wherein the first partition and the connector seat are molded one time.

7. The battery pack connector waterproof structure according to claim 5, wherein two adjacent first partitions are connected to each other through a second partition.

8. The battery pack connector waterproof structure according to claim 7, wherein the first partitions and the second partition are molded one time.

9. The battery pack connector waterproof structure according to claim 8, wherein the connector seat, the first partitions, and the second partition are molded one time.

10. A battery pack, comprising a housing and a core battery and the battery pack connector waterproof structure according to claim 1, wherein the core battery is secured to the lower housing, the support plate is laid between the core battery and the upper housing, and the metal clips are electrically connected to the core battery.

11. The battery pack according to claim 10, wherein the lower end face of the connector seat is further provided with a third sealing recess, the plurality of metal clips pass through a bottom of the third sealing recess, a third sealing member is disposed in the third sealing recess, and the third sealing member is configured to fill a gap between the plurality of metal clips and the third sealing recess.

12. The battery pack according to claim 11, wherein the third sealing recess directly connects with the second sealing recess, and the third sealing member and the second sealing member are molded one time.

13. The battery pack according to claim 10, further comprising a fourth sealing member configured to fill a surrounding gap between the plurality of metal clips and the support plate.

14. The battery pack according to claim 10, wherein the connector seat is provided with a plurality of connector insertion recesses corresponding to the connector insertion holes, a first partition is disposed between two adjacent ones of the plurality of connector insertion recesses, and the first partition is secured to the connector seat.

15. The battery pack according to claim 14, wherein the first partition and the connector seat are molded one time.

16. The battery pack according to claim 14, wherein two adjacent first partitions are connected to each other through a second partition.

17. The battery pack according to claim 16, wherein the first partitions and the second partition are molded one time.

18. The battery pack according to claim 17, wherein the connector seat, the first partitions, and the second partition are molded one time.

\* \* \* \* \*